March 29, 1932.  F. SMITH  1,851,375
HORSE HAYRAKE EJECTOR
Filed July 12, 1930
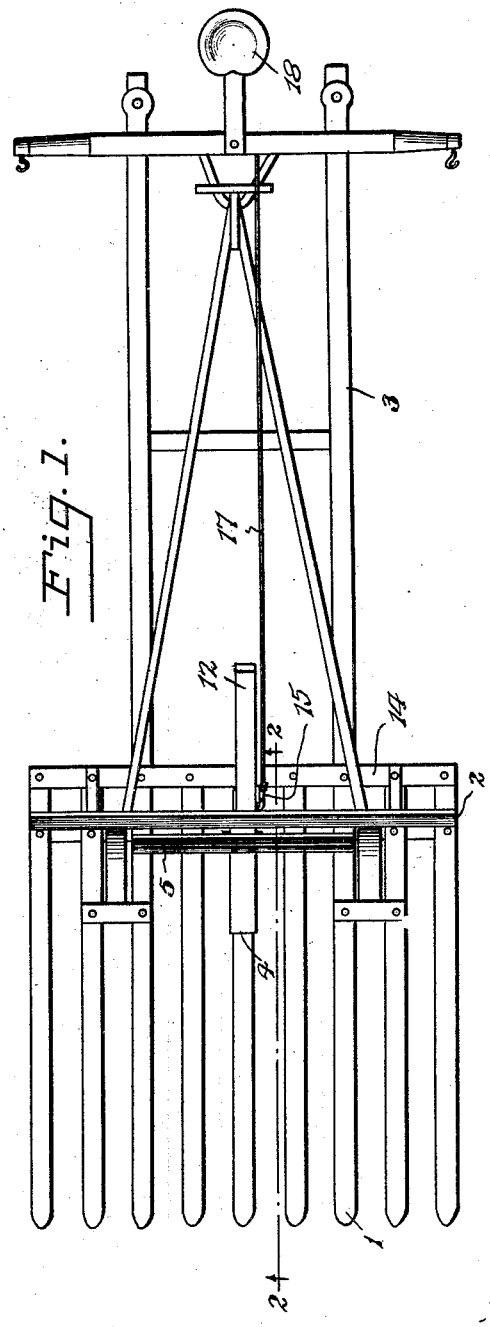
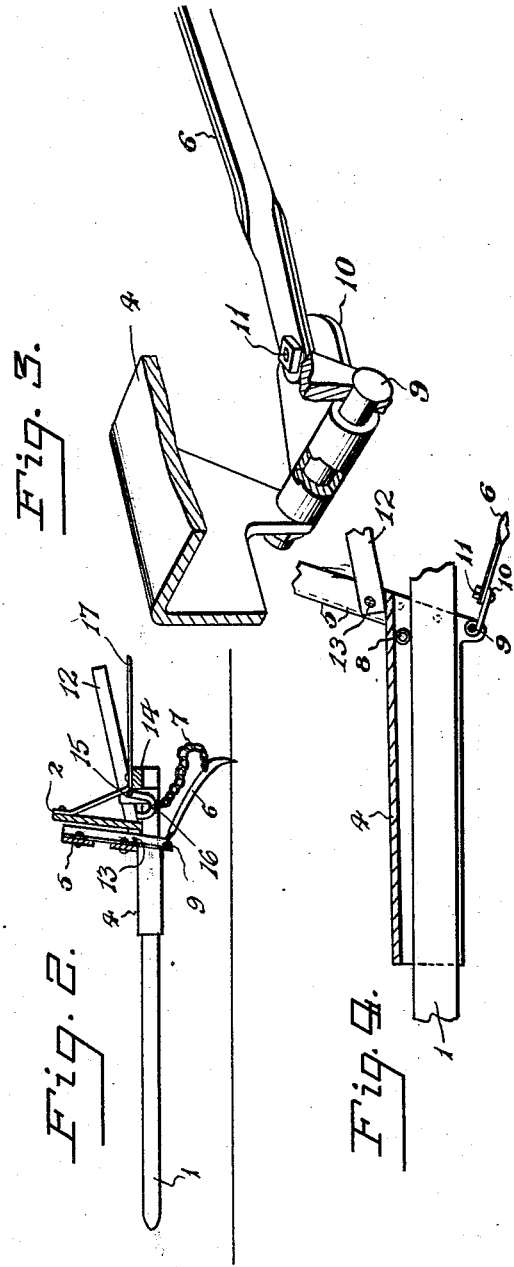
Inventor
F. Smith
By Lacey & Lacey, Attorneys Patented Mar. 29, 1932

1,851,375

UNITED STATES PATENT OFFICE

FRANCIS SMITH, OF SILT, COLORADO

HORSE HAYRAKE EJECTOR

Application filed July 12, 1930. Serial No. 467,551.

This invention relates to means for automatically removing hay, straw and the like from mechanically propelled rakes, and provides an ejector attachment adapted to be readily applied to any type and make of rake without requiring any change or modification in the construction thereof, or the services of a skilled mechanic.

The attachment contemplates and includes a slide, a head at the rear end of the slide, a prong preferably at the rear end of the slide and pivoted thereto, and a check for limiting the forward movement of the prong, the attachment being readily applied to and removable from the rake.

While the drawings illustrate a preferred embodiment of the invention, it is to be understood that in adapting the means to meet specific needs and requirements, the design may be varied and changes in the minor details of construction may be resorted to within the scope of the invention as claimed without departing from the spirit thereof.

For a full understanding of the invention and the merits thereof, reference is to be had to the following description and the drawings hereto attached, in which:

Figure 1 is a top plan view of a horse hay rake of conventional form provided with hay ejecting means embodying the invention.

Figure 2 is a longitudinal sectional view on the line 2—2 of Figure 1.

Figure 3 is a fragmentary perspective view of parts of the slide and prong, showing the means pivotally connecting the prong to the slide.

Figure 4 is a detail sectional view of the slide and a part of the head attached thereto and showing a portion of a rake tooth upon which the attachment is mounted.

Corresponding and like parts are referred to in the following description and designated in the several views of the drawings by like reference characters.

The rake illustrated is of conventional form and is shown to demonstrate the application of the invention and comprises teeth 1, head 2, and draft frame 3, to which a team of horses is adapted to be hitched in the accustomed manner.

The hay ejecting attachment comprises a slide 4, a head 5 at the rear end of the slide, a prong 6 pivoted to the rear end of the slide, and a check 7 for limiting the forward movement of the prong.

The slide 4 is elongated and channeled in its bottom side to embrace the top and opposite sides of a rake tooth 1. This side preferably consists of a length of channel iron or may be formed from a metal plate bent into U-shape to straddle a tooth 1 of the rake. To reduce the friction to the smallest amount possible a roller 8 is disposed within the upper rear portion of the slide and engages the top side of the tooth 1 upon which the attachment is mounted. A bolt 9 connects the side pieces of the slide 4 adjacent their rear ends and extends across the bottom side of the tooth 1 to prevent vertical displacement of the slide. The prong 6 is pivotally connected to the slide by means of the bolt 9. A plate 10 is pivotally mounted upon the bolt 9 and the prong 6 is pivotally connected to the plate 10 by means of a bolt 11. It will thus be understood that the prong 6 moves with the plate 10 about the bolt or fastening 9 and has an independent pivotal movement about the bolt or fastening 11. In effect, the prong 6 has a two-fold pivotal movement.

The attachment may be applied to a rake by slipping it upon the middle tooth so that the roller 8 rests upon the top of the tooth and the bolt 9 extends across the bottom side of the tooth. When the rake is pushed forward to gather the hay or other product, the prong 6 rides upon the ground and when it is required to discharge the load, the rake is backed and during this movement the prong 6 penetrates the ground and holds the ejector stationary, with the result that it pushes the hay from the rake as the latter is moved rearward. By having the prong 6 pivotally connected to the slide 4 in the manner indicated, the rake may be turned in either direction preliminary to recrossing the field after discharging the load. The attachment is automatic in action and may be readily applied to and quickly removed from a rake, as will be readily appreciated.

A bar 12 is pivoted to the head 5, at 13, and extends rearwardly. This bar rests upon a cross piece 14 and normally inclines upwardly and rearwardly. The driver or attendant may push the ejector forward by pressing upon the bar 12 which, when it clears the cross piece 14, drops in front thereof and rests upon a trip 15 which is pivoted on the cross piece. This trip is substantially U-shaped and its members are of different lengths, the short member 16 engaging under the bar 12 and the long member having a cord 17 connected thereto and extending within convenient reach of the driver's seat 18. A pull on the cord 17 rocks the trip 15 and lifts the rear end of the bar 12 to clear the cross piece 14 which constitutes a stop to engage and hold the bar 12 when the latter is pressed forward. When the bar 12 is pushed forward, its rear end drops in front of and abuts the cross piece 14, and the bar then serves as a lock to prevent backward movement of the ejector when it is desired to drive the rake and its load to the teeth of a stacker. In its action, the ejector is automatic, the prong riding over the ground during the forward movement of the rake and instantly digging into the ground when the rake is drawn backward.

What is claimed is:

1. Means for removing the load from a rake upon a reverse movement of the rake, said means consisting of a slide mounted upon a tooth of the rake, a head at the rear end of the slide normally in front of the head of the rake, a prong pivoted to the slide and adapted to move freely over the ground during the forward movement of the rake and to penetrate the ground below the rake and hold the slide stationary when the rake is moved rearward, and a check connecting the prong and the rake to limit the forward movement of the prong.

2. Means for removing the load from a rake upon a reverse movement of the rake, said means consisting of a slide mounted upon a tooth of the rake, a head at the rear end of the slide, a plate pivotally connected to the slide to rock in a vertical plane, a prong pivoted to the plate to swing laterally and extending rearwardly therefrom, and a flexible check connecting the prong and the rake to limit the forward swinging of the prong.

3. An attachment for horse hay rakes for discharging the load, the same comprising an elongated slide of approximately inverted U-shape in cross section to straddle a tooth of the rake, a head attached to the rear end of the slide, a roller within the rear portion of the slide between the top of the same and the rake tooth, a transverse fastening at the rear end of the slide to extend across the bottom side of the rake tooth upon which the attachment is mounted, a plate pivoted to said transverse fastening to rock in a vertical plane, a prong pivoted to the plate to swing laterally, and a check between the prong and rake limiting the forward rocking of the prong.

4. An attachment for a horse hay rake comprising a slide to fit upon a tooth of the rake, a head carried by the slide, a bar pivoted to the head and extending rearwardly therefrom, a stop on the rake to be engaged by the pivoted bar and hold said bar pressed forward, and a trip on the rake operable from the driver's seat to effect release of the pivoted bar from the said stop.

In testimony whereof I affix my signature.

FRANCIS SMITH. [L. S.]